United States Patent [19]
Himeda

[11] Patent Number: 6,138,063
[45] Date of Patent: Oct. 24, 2000

[54] AUTONOMOUS VEHICLE ALWAYS FACING TARGET DIRECTION AT END OF RUN AND CONTROL METHOD THEREOF

[75] Inventor: Satoshi Himeda, Amagasaki, Japan

[73] Assignee: Minolta Co., Ltd., Osaka, Japan

[21] Appl. No.: 09/031,758

[22] Filed: Feb. 27, 1998

[30] Foreign Application Priority Data

Feb. 28, 1997 [JP] Japan ..................................... 9-045362

[51] Int. Cl.[7] .............................. G01C 22/00; G05D 1/00
[52] U.S. Cl. .................................. 701/23; 701/69; 701/75; 29/273; 318/568.12
[58] Field of Search ................................ 701/23, 25, 205, 701/69, 72, 75; 318/568.12, 587; 382/153; 29/273; 180/197

[56] References Cited

U.S. PATENT DOCUMENTS

| | | |
|---|---|---|
| 4,556,940 | 12/1985 | Katoo et al. ............................... 701/25 |
| 4,674,048 | 6/1987 | Okumura . |
| 5,155,684 | 10/1992 | Burke et al. ............................... 701/28 |
| 5,189,612 | 2/1993 | Lemercier et al. ........................ 701/23 |
| 5,208,521 | 5/1993 | Aoyama . |
| 5,402,051 | 3/1995 | Fujiwara et al. ........................... 701/25 |

*Primary Examiner*—William A. Cuchlinski, Jr.
*Assistant Examiner*—Gertrude Arthur
*Attorney, Agent, or Firm*—McDermott, Will & Emery

[57] ABSTRACT

An autonomous vehicle includes a chassis, pair of drive wheels, a motor for driving these drive wheels, a gyrosensor provided at the chassis for detecting a direction of the chassis, and a travel control unit responsive to an output of the gyrosensor at the end of a travel of a predetermined run indicating difference from a target direction for providing control of the rotation amount of the drive wheels so that the direction of the chassis is corrected by a predetermined amount to be aligned with the target direction. A method of controlling this autonomous vehicle is also disclosed.

20 Claims, 10 Drawing Sheets

AUTONOMOUS VEHICLE ALWAYS FACING TARGET DIRECTION AT END OF RUN AND CONTROL METHOD THEREOF

BACKGROUND OF THE INVENTION

1. Field of the Invention

The present invention relates to an autonomous vehicle that can run and turn in an arbitrary direction by driving a pair of drive wheels individually. Particularly, the present invention relates to an autonomous vehicle such as an autonomous cleaning robot or an autonomous waxing robot that is used in an environment where the state of the floor affects the run.

2. Description of the Related Art

This application is based on Japanese Patent Application No. 9-045362 filed in Japan, the contents of which are hereby incorporated by reference.

Conventional autonomous vehicles include autonomous cleaning robots and autonomous waxing robots having a cleaning task unit for cleaning the floor and a waxing task unit for applying wax on the floor attached to the rear of the chassis that carries out the autonomous travel. Such apparatuses have a pair of drive wheels at the bottom of the chassis and a driven wheel for supporting the chassis. The apparatus can run in an arbitrary direction or turn at a certain site by providing individual control of each of the drive wheels. The apparatus autonomously selects a course according to the environmental situation to run according to a program prepared in advance. The floor is cleaned or waxed in this manner. The autonomous travel is controlled according to the distance of travel of each of the drive wheels forming a pair.

There is a possibility of the drive wheels of the autonomous vehicle slipping on the floor due to external force and depending on the state of the floor. The floor is particularly slippery when the floor is cleaned or when a coat of wax is applied, so that the possibility of slipping becomes higher. In a conventional autonomous vehicle, the control of the autonomous travel is implemented according to the distance of travel of the drive wheels. Therefore, the actual orientation of the chassis can differ from the angle envisaged in controlling the autonomous travel by the occurrence of slipping. On this occasion, there was a problem that autonomous travel could not be carried out properly. This problem is particularly serious at the time of a specific travel inducing the occurrence of slipping such as at the rotation of the chassis.

SUMMARY OF THE INVENTION

In view of the foregoing, an object of the present invention is to provide an autonomous vehicle that can always have the direction aligned with the target direction at the end of a travel of a predetermined run, and a control method thereof.

It is desirable that such control is as easy as possible when the amount of correction is particularly small. Therefore, another object of the present invention is to provide an autonomous vehicle that can always have the direction coincide with the target direction at the end of a travel of a predetermined run, and that can carry out angle correction reliably without any complicated control if the amount of correction is small, and a control method thereof.

When the amount of correction is great, there is a possibility of slipping occurring again at the time of correction. It is therefore desirable to ensure the angle correction even when the amount of correction is great. Thus, a further object of the present invention is to provide an autonomous vehicle that can always have the direction aligned with the target direction at the end of a travel of a predetermined run, and that can carry out angle correction reliably even when the amount of correction is great, and a control method thereof.

When the amount of correction is great, there is a possibility that the time required for angle correction is increased. It is preferable to minimize the time required for angle correction in order to shorten the time of the task. Thus, still another object of the present invention is to provide an autonomous vehicle that can always have the direction aligned with the target direction at the end of a travel of a predetermined run, and that can carry out correction in as short a time as possible even when the amount of correction is great, and a control method thereof.

When the amount of correction is great as described above, it is further preferable to select the mode of correction. More specifically, the correction mode of carrying out angle correction reliably at the expense of time, or in a minimum time should be selected. Thus, a still further object of the present invention is to provide an autonomous vehicle that can always have the direction aligned with the target direction at the end of a travel of a predetermined run, and that can specify which mode of ensuring the correction or shortening the time required for correction is to be given priority to carry out the correction operation according to the specification, and a control method thereof.

The above-described problem is particularly encountered in a rotating operation where slipping easily occurs. It is therefore particularly preferable to have the direction of the chassis aligned with the target direction when turning. Thus, yet a further object of the present invention is to provide an autonomous vehicle that can always have the direction aligned with the target direction at the end of a travel of a predetermined run, and particularly in a turning operation where slipping easily occurs, have the direction reliably aligned with the target direction when turning, and a control method thereof.

An autonomous vehicle according to an aspect of the present invention includes a chassis having a pair of drive wheels, and that can run and turn in an arbitrary direction by providing individual control of the pair of drive wheels, a drive circuit for driving the drive wheels, a control circuit for moving the chassis autonomously according to the distance of travel of the drive wheels, an angle detection circuit provided at the chassis for detecting the direction of the chassis, and an angle correction unit responsive to an output of the angle detection circuit at the end of a travel of a predetermined run differing from the target direction for driving the drive wheels so that the direction of the chassis is corrected by a predetermined amount to align with the target direction.

At the end of the travel of a predetermined run, the output of the angle detection circuit is compared with the target direction. When the output differs from the target direction, the direction of the chassis is corrected by a predetermined amount by the angle correction unit and the drive wheels to align with the target direction. Thus, the direction of the chassis can be aligned with the target direction at the end of the travel of a predetermined run.

Preferably, the drive circuit rotates the drive wheels at a speed according to a trapezoid travel pattern. According to the trapezoid travel pattern, the drive wheels are rotated at a low speed for a predetermined time after the run is initiated, and at a high speed at the elapse of that predetermined time. When the amount of correction is small, the correction of a predetermined amount can be completed during the rotation of the drive wheels at the low running speed. Since the possibility of the occurrence of slipping is low when the rotation of the drive wheels is low in contrast to a high speed, angle correction can be carried out reliably. Since the drive circuit drives the drive wheels according to the trapezoid travel pattern during a normal run as well as during angle correction, a complicated control employing a particular travel pattern for correction does not have to be provided.

Further preferably, the drive circuit can drive the drive wheels at a speed according to a plurality of types of trapezoid travel patterns, each having different maximum speed. The drive circuit drives the drive wheels according to a first trapezoid travel pattern at the time of a general run, and a second trapezoid travel pattern having a maximum speed lower than the maximum speed of the first trapezoid travel pattern at the time of angle correction.

The possibility of the occurrence of slipping becomes higher as the speed of the drive wheel is increased. The possibility of slipping is reduced during the correction operation by driving the drive wheels according to a trapezoid travel pattern having a maximum speed lower than that of a normal run. Thus, angle correction can be reliably carried out by a fewer number of times of correction even when the amount of correction is great.

Further preferably, the drive circuit can drive the drive wheels at a speed according to at least three trapezoid travel patterns having different maximum speeds. The drive circuit selects in a step-graded manner a trapezoid travel pattern having a maximum speed lower than the maximum speed of a trapezoid travel pattern that was employed just before at the time of angle correction to drive the drive wheel according to the selected trapezoid travel pattern.

In an angle correction operation, angle correction required as a result of occurrence of slipping after running along a certain trapezoid travel pattern is carried out along another trapezoid travel pattern having a maximum speed lower by one step than that certain trapezoid travel pattern. When slipping occurs again after this correction, a trapezoid travel pattern having a maximum speed of one lower step is employed to carry out the angle correction. Such a process is appropriately repeated thereafter. Thus, correction can be completed in a short period of time even when the amount of correction is great since the angle correction is carried out at a higher speed as possible.

Further preferably, the autonomous vehicle further includes a circuit for specifying an angle correction mode. When the first angle correction mode is specified, the drive circuit carries out angle correction according to a predetermined first control mode. When the second angle correction mode is specified, the drive circuit carries out angle correction according to a second control mode differing from the first control mode.

When the first angle correction mode is specified according to the circuit for specifying an angle correction mode, angle correction is carried out in the first control mode. For example, the drive wheels may be driven according to a first trapezoid travel pattern having the lowest maximum speed at the time of angle correction. The possibility of occurrence of slipping again is low by virtue of the slow speed. This ensures the angle correction even when the amount of correction is great. When the second angle correction mode is specified, angle correction is carried out in the second control mode that differs from the first control mode. For example, the trapezoid travel pattern having a maximum speed that is lower by just one step than the maximum speed of an trapezoid travel pattern which was used immediately before may be selected for the correction. When a further correction is required, a similar selection of a trapezoid travel pattern is carried out. A speed as high as possible is employed as the speed of the drive wheels during the correction. Therefore, the correction can be completed at a shorter period of time even when the amount of correction is great. Thus, specification of an angle correction mode allows the selection of the preference of which aspect is to be given priority such as whether to carry out angle correction reliably or in a shorter period of time.

According to the present invention, the direction of the chassis at the time of a turn can be aligned with the target direction in a turning operation where slipping easily occurs.

A control method of an autonomous vehicle according to another aspect of the present invention provides control of an autonomous vehicle having a pair of drive wheels for running and turning in an arbitrary direction by providing individual control of the pair of drive wheels. The control method of an autonomous vehicle includes an angle detection step for detecting the direction of the chassis, a step of determining that the output of the angle detection step at the end of a travel of a predetermined run differs from the target direction, and a step for driving the drive wheels so that the direction of the chassis is corrected for a predetermined amount to be aligned with the target direction.

According to a further aspect of the present invention, an autonomous vehicle includes a chassis, a pair of drive wheels, a motor for driving the drive wheels, a gyrosensor provided at the chassis for detecting the direction of the chassis, and a travel control unit responsive to an output of the gyrosensor at the end of a travel of a predetermined time differing from the target direction for providing the control of the amount of rotation of the drive wheels so as to correct the direction of the chassis by a predetermined amount to be aligned with the target direction.

According to still another aspect of the present invention, an autonomous vehicle includes a chassis, a motor for driving a pair of drive wheels, a travel control unit for controlling the motor, and a gyrosensor provided at the chassis for detecting the direction of the chassis. The travel control unit determines whether the output of the gyrosensor at the end of the travel of a predetermined run differs from the target direction. When the output of the gyrosensor differs from the target direction, the motor is controlled so that the direction of the chassis get aligned with the target direction.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
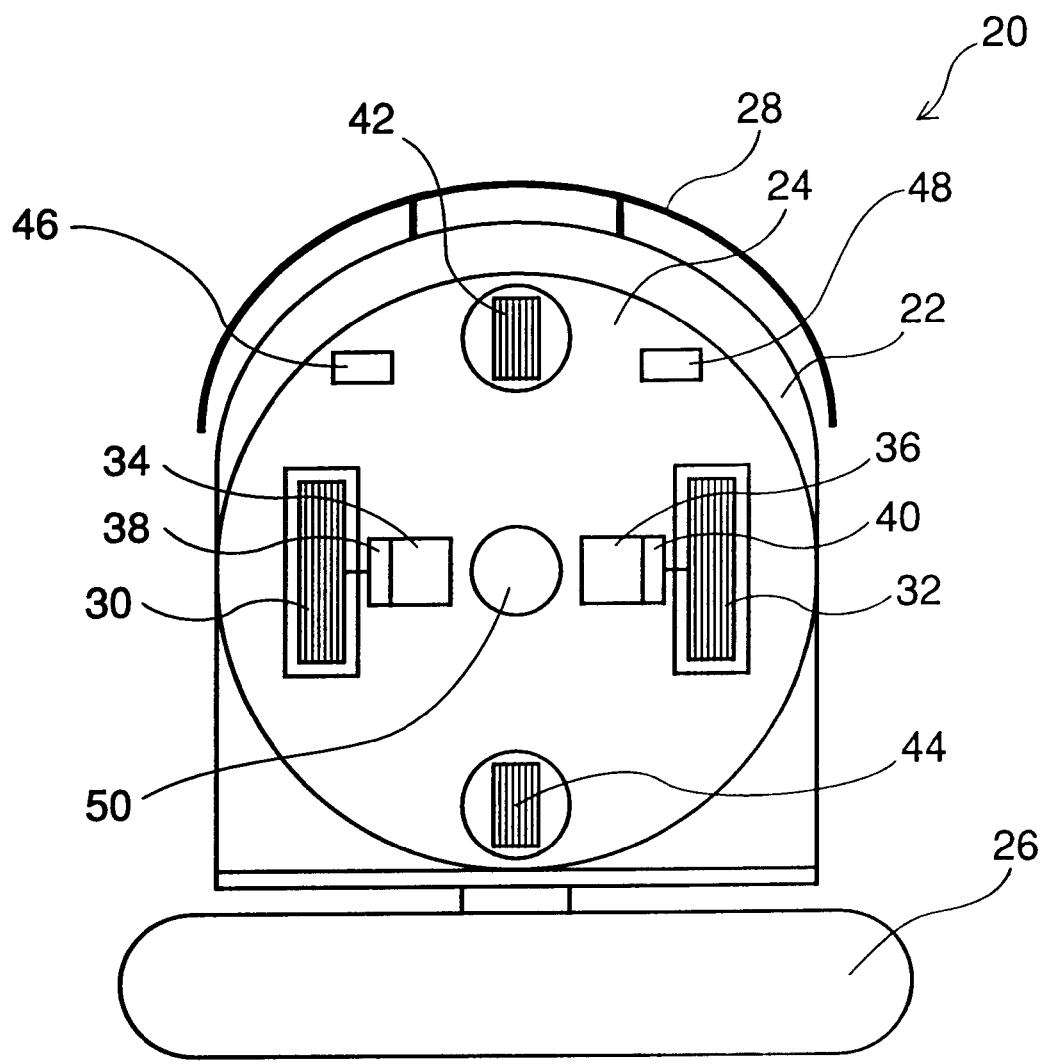
FIG. 1 is a schematic plan view of an autonomous waxing robot according to an embodiment of an autonomous vehicle of the present invention.
Figure 2:
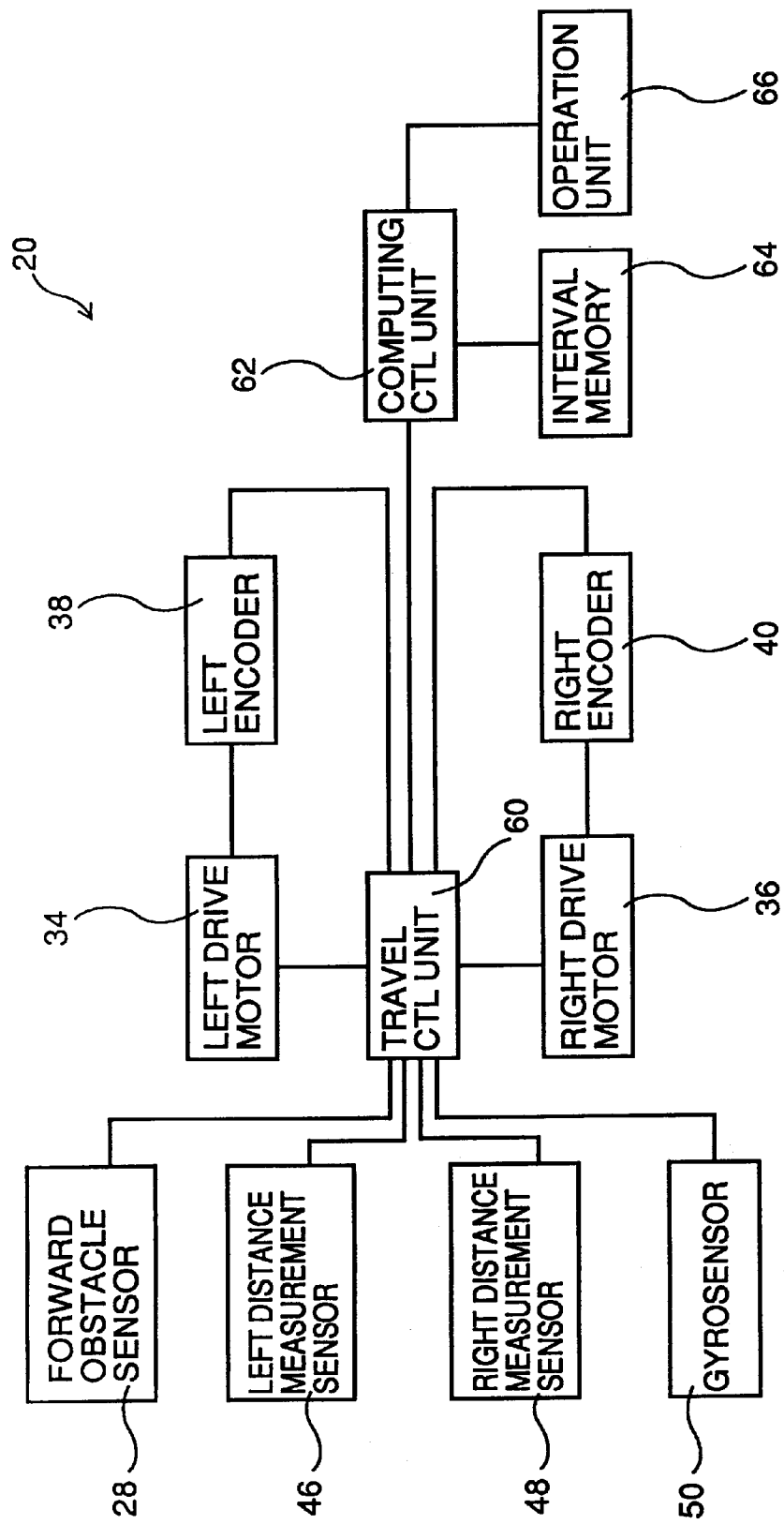
FIG. 2 is a block diagram of a control system of the autonomous waxing robot of the present invention.

A structure of an autonomous waxing robot 20 according to a first embodiment of an autonomous vehicle of the present invention is schematically shown in the plan view of FIG. 1. FIG. 2 is a block diagram thereof. Structures similar to those shown in FIGS. 1 and 2 are employed in subsequent embodiments.

Referring to FIG. 1, an autonomous waxing robot 20 includes a chassis 22 with a mobile unit 24 where a left drive wheel 30 and a right drive wheel 32 are provided to run or turn towards an arbitrary direction by individual control of the pair of drive wheels 30 and 32, caster wheels 42 and 44 provided below mobile unit 24 at the front and back, and unrestricted in the direction of rotation, a forward obstacle sensor 28 provided at the front of chassis 22 for sensing an obstacle by abutting an obstacle located ahead, left and right distance measurement sensors 46 and 48 provided at either side at the front portion of mobile unit 24, a wax apply task unit 26 provided at the rear of chassis 22 for applying wax on the floor, motors 34 and 36 for rotating left and right drive wheels, encoders 38 and 40 for detecting the number of revolutions of motors 34 and 36, respectively, and a gyrosensor 50 provided at the center of chassis 22.

Referring to FIG. 2, autonomous waxing robot 20 further includes a run control unit 60 receiving signals from forward obstacle sensor 28, left distance measurement sensor 46, right distance measurement sensor 48, gyrosensor 50, left encoder 38 and right encoder 40 for providing individual control of left and right drive motors 34 and 36 for an autonomous travel according to a predetermined program, an interval memory 64 for storing the distance (interval) between each reciprocating run when autonomous waxing robot 20 moves back and forth on the floor, an operation unit 66 for specification of an operational mode and designation of initiation of an operation by a user, and a computing control unit 62 connected to interval memory 64 and operation unit 66 for computing and providing to travel control unit 60 data required for autonomous travel.

Autonomous waxing robot 20 of the present embodiment is characterized by including a gyrosensor 50 for detecting the direction of chassis 20 independent of the travel of the wheels, in addition to encoders 38 and 40, so that deviation in the angle due to slipping of the wheels is corrected by travel control unit 60. This feature is implemented mainly by a software. The structure of such a software will be described afterwards. Here, a general operation of autonomous waxing robot 20 will be described.

When wax is to be applied on a floor of a rectangular area, chassis 22 is placed at a position parallel to one of the walls. Then, initiation of the operation is designated. Robot 20 individually drives motors 34 and 36 to attempt to move parallel to the wall while measuring the distance from the wall through left and right distance measurement sensors 46 and 48. The arrival at a forward wall is sensed by, for example, forward obstacle sensor 28 so as to turn rightwards or leftwards by 90°. When robot 20 is running parallel along a right side wall, for example, robot 20 turns leftwards by 90°. From that position, robot 20 moves forward by a certain distance stored in interval memory 64 shown in FIG. 2. Then, robot 20 turns 90° again in a direction identical to that of the previous turn. As a result, robot 20 will run along a parallel course in a direction opposite to that of the previous run for applying wax. At this stage, chassis 22 must be maintained parallel to the wall. This travel is called "wall tracer travel". For this wall tracer travel, the output of motors 34 and 36 obtained by encoders 38 and 40, i.e. the number of revolutions of drive wheels 30 and 32, are utilized. The distance of travel by drive wheels 30 and 32 is obtained from the number of revolutions of respective wheels. The direction of chassis 22 can be acquired from the difference between the distance of travel. Motors 34 and 36 are controlled so that this direction is maintained in a desired direction. For a turning operation of robot 20, left drive wheel 30 and right drive wheel 32 are rotated in opposite directions to perform a turn at that site. The angle of rotation here is also calculated from the outputs of encoders 38 and 40.

When the desired target direction does not match the actual direction of chassis 22 as a result of a travel, for example a turning operation, carried out according to the outputs of encoders 38 and 40, gyrosensor 50 is used to correct this offset. The occurrence of such error will be described hereinafter with reference to FIGS. 3 and 6.

Figure 3:
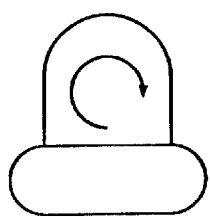
FIG. 3 is a schematic plan view of the autonomous waxing robot.
Figure 4:
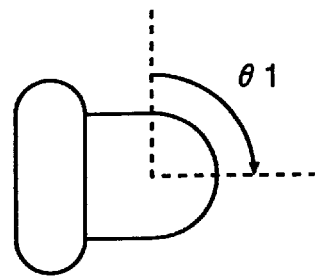
FIG. 4 is a plan view of the autonomous waxing robot that is turned by a predetermined angle.
Figure 5:
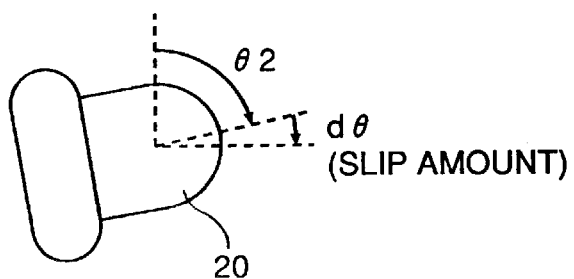
FIG. 5 is a plan view of the autonomous waxing robot when the amount of turning is insufficient due to slipping.
Figure 6:
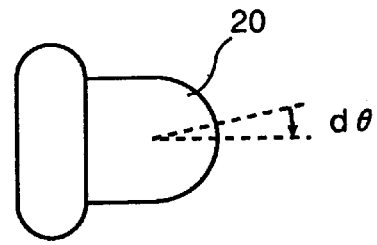
FIG. 6 is a plan view of the autonomous waxing robot subjected to corrected turning corresponding to the amount of slipping.

Consider the case referring to FIG. 3 in which chassis 22 is to be turned rightwards by an angle of θ1 as shown in FIG. 4 at a certain site. Ideally, chassis 22 is rotated by an angle of θ1 precisely as shown in FIG. 4. However, this is often not achieved in practice. This is mainly because of the slipping of drive wheel 30 or 32 depending upon the state of the floor. Occurrence of slipping may result in robot 20 rotating at an angle of only θ2 that is smaller than angle θ1 as shown in FIG. 5. The difference dθ between angles θ1 and θ2 corresponds to the amount of slipping. When a slipping amount dθ is detected, robot 20 is further rotated corresponding to the slipping amount of dθ as shown in FIG. 6. As a result, robot 20 is oriented towards a desired direction. Slipping amount dθ is detected by checking the difference between a predetermined target direction for turning and the actual angle detected by gyrosensor 50.

Figure 7:
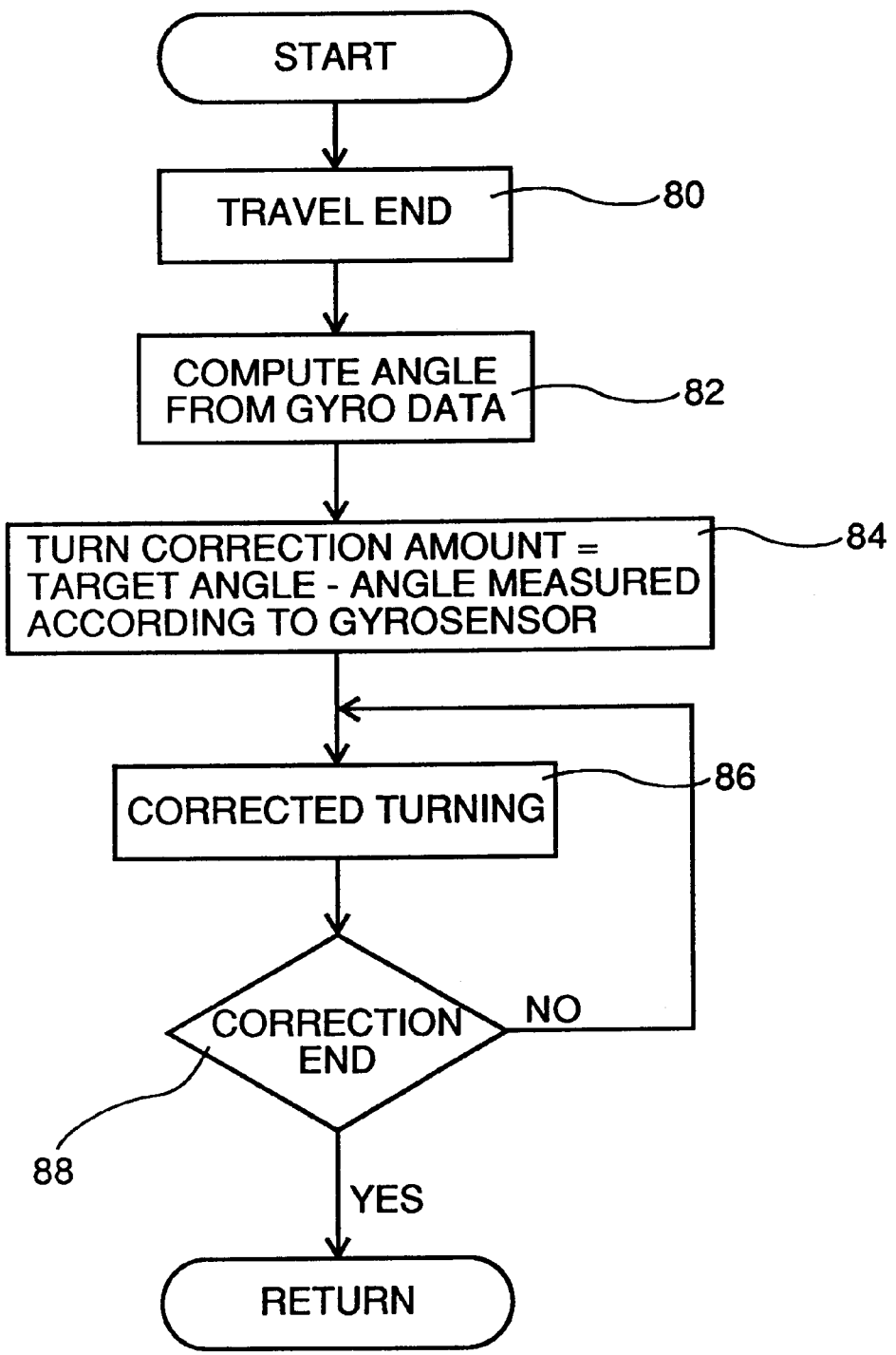
FIG. 7 is a flow chart of a correction process carried out in the autonomous waxing robot according to a first embodiment of the present invention.

FIG. 7 is a flow chart of an angle correction program that is executed by travel control unit 60. Consider the case where a process of a travel of a predetermined run ends at step 80. Here, "a travel of a predetermined run" may be the end of one travel of the aforementioned wall tracer travel, or a turn from the state shown in FIG. 3 to the state shown in FIG. 5, for example.

At step 82, the actual angle of robot 20 is computed according to the gyro data output from gyrosensor 50. At step 84, the difference dθ between the target angle and the angle measured according to the gyro data is computed as the turn correction amount.

At step 86, the turning operation of robot 20 is effected so as to turn by just the calculated turn correction amount. This turning operation is similar to a normal turning operation provided that the turn correction amount is specified as the amount to turn according to a predetermined travel pattern in the present embodiment. At step 88, determination is made whether the correction is completed or not. This determination is identical to the processes carried out at steps 82 and 84. Determination is made whether robot 20 has actually rotated by just the turn correction amount by obtaining the difference between the target and the angle measured according to the gyro data. The correction operation ends when the target angle coincides with the angle measured according to the gyro data. Otherwise, a process similar to step 84 is carried again to effect the corrected turning of step 86. The processes of steps 86 and 88 are appropriately repeated.

Thus, the target angle can be aligned eventually with the actual angle of robot 20.

In the first embodiment, control of drive motors 34 and 36 (refer to FIG. 1) is identical for both corrected turning and normal turning. Motors 34 and 36 are controlled according to a travel pattern shown in FIG. 8.

Figure 8:
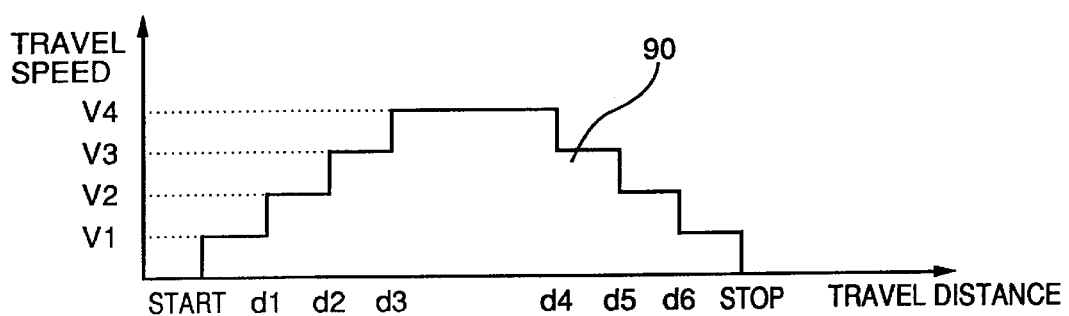
FIG. 8 is a graph showing a speed control pattern of the first embodiment.

Referring to FIG. 8, a travel control pattern 90 according to the robot of the present embodiment has characteristics set forth in the following. In FIG. 8, the distance of travel (turning amount) of drive wheel 30 or 32 is plotted along the horizontal axis, and the travel speed (turning speed) of drive wheel 30 or 32 is plotted along the vertical axis. Regarding the distance of travel, the point denoted "START" is the point of travel distance 0. Travel distances d1–d6 and the point denoted "STOP" indicate the distance of travel corresponding to 5°, 10°, 15°, 75°, 80°, 85° and 90°, respectively.

Travel speeds V1–V4 indicate the travel speed corresponding to the maximum speed of 20%, 40%, 60% and 80%, respectively, relative to a set maximum speed of 100%. In the present embodiment, the area from 80% to 100% is prepared to absorb variation in voltage and components such as the motor. Therefore, a travel speed exceeding 80% is not employed in the speed control pattern.

The travel control pattern of FIG. 8 has a trapezoid shape in which the width in the direction of the horizontal axis becomes greater downwards and smaller upwards. Such a speed control pattern having a speed in a plurality of steps and a trapezoid shape when the relationship between the travel distance and the travel speed is represented in a graphical manner is referred to as a "trapezoid travel pattern". It is to be noted that a trapezoid travel pattern also includes a pattern where only one step of speed is used.

In the general rotation of a drive wheel, the possibility of the occurrence of slipping is extremely high if the rotation speed is set high initially. Thus, a trapezoid travel pattern as shown in FIG. 8 is employed to avoid such slipping.

The usage of such a trapezoid travel pattern provides the following advantage. When an amount of turn as shown in FIG. 6 is to be corrected, the correction amount is often small. The time required for rotating the drive wheel can be shortened if the drive wheel is driven exactly corresponding to this small turning amount. The drive wheel is driven at the lowest speed V1 of the trapezoid travel pattern when the correction is completed before the travel distance d1 shown in FIG. 8 is covered. As a result, the drive wheel is moved at the lowest travel speed when the turning correction amount is small. Thus, correction of a turn can be carried out in which the desired direction is reliably made to be aligned with the direction of robot 20 when the turning correction amount is small.

Second Embodiment

In the previous first embodiment, the possibility of the drive wheel slipping at the time of turning correction is low if the turning correction amount is small even when the speed control pattern of a normal turning operation is used. However, when the amount of slipping is great and the distance of travel becomes longer, there is a possibility of occurrence of slipping since the travel speed of the drive wheel is increased in a step-graded manner. The second embodiment is aimed to reduce the possibility of the occurrence of slipping during correction even when the correction amount is great.

Figure 9:
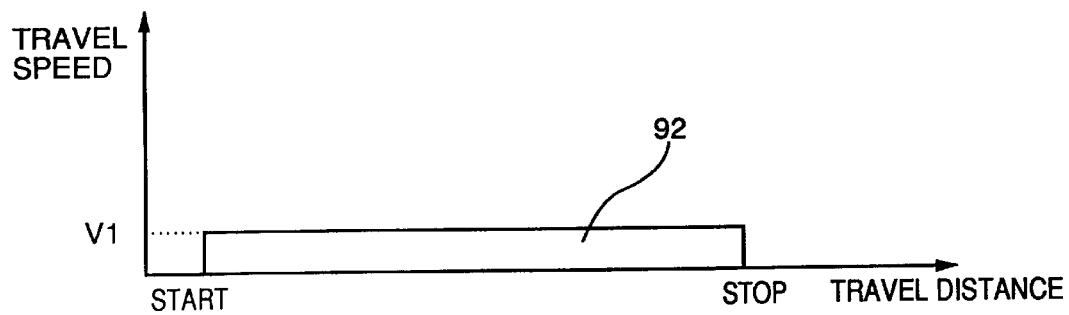
FIG. 9 is a graph showing a speed control pattern according to a second embodiment of the present invention.

For this purpose, a speed control pattern 92 having only one step as shown in FIG. 9 is used for the turning correction in contrast to the trapezoid travel pattern having a plurality of steps as shown in FIG. 8. More specifically, the speed control pattern shown in FIG. 8 is used in a normal turning operation, and a speed control pattern as shown in FIG. 9 having the speed of V1 corresponding to 20% of the set maximum speed is used in the correction. This means that the travel speed is maintained at a low level even when the correction amount is increased. The possibility of having to carry out a further turning correction caused by slipping during a previous turning correction is reduced.

The hardware structure of the autonomous waxing robot according to the second embodiment is similar to that of the first embodiment. Therefore, details thereof will not be repeated here.

Figure 10:
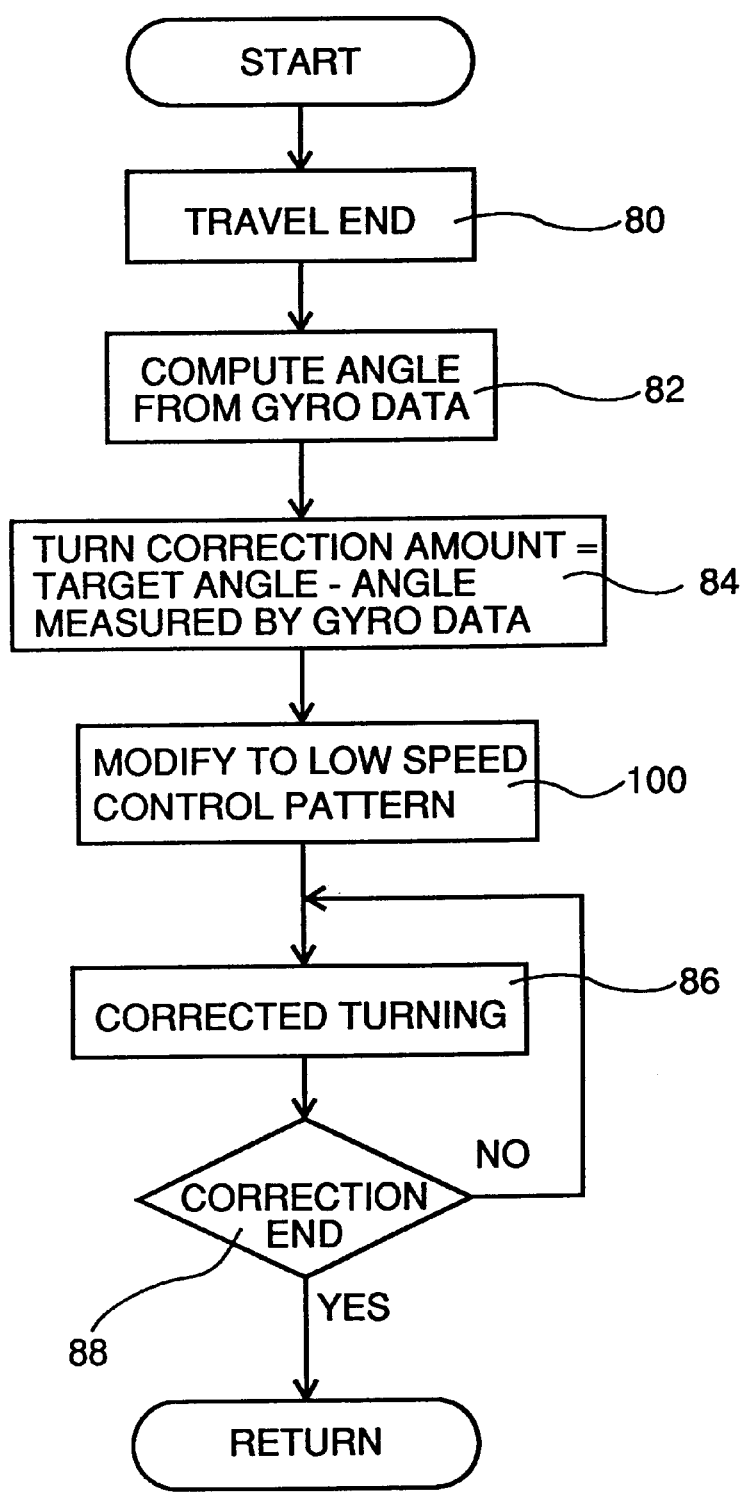
FIG. 10 is a flow chart of a correction process of the second embodiment.

FIG. 10 is a flow chart of the program for realizing the process of the second embodiment. The flow chart of the second embodiment differs from the flow chart of the first embodiment shown in FIG. 7 in that a step 100 for modifying the speed control pattern to a low speed control pattern is added between step 84 and step 86. The remaining elements are identical to those of the first embodiment. The low speed control pattern employed at step 100 is the pattern 92 shown in FIG. 9.

By providing this new step 100, the travel speed of the corrected turn carried out at step 86 is the lowest speed V1. This speed does not change even when the correction amount becomes greater. Therefore, the possibility of having to carry out a corrected turn again caused by further slipping in a previous corrected turn becomes lower. Thus, correction can be carried out reliably.

Third Embodiment

In the previous second embodiment, only the lowest speed is used in the corrected turn. Although correction can be carried out reliably, this correction is time-consuming due to the low travel speed. The third embodiment is aimed to reduce the time required for correction.

Figure 11:
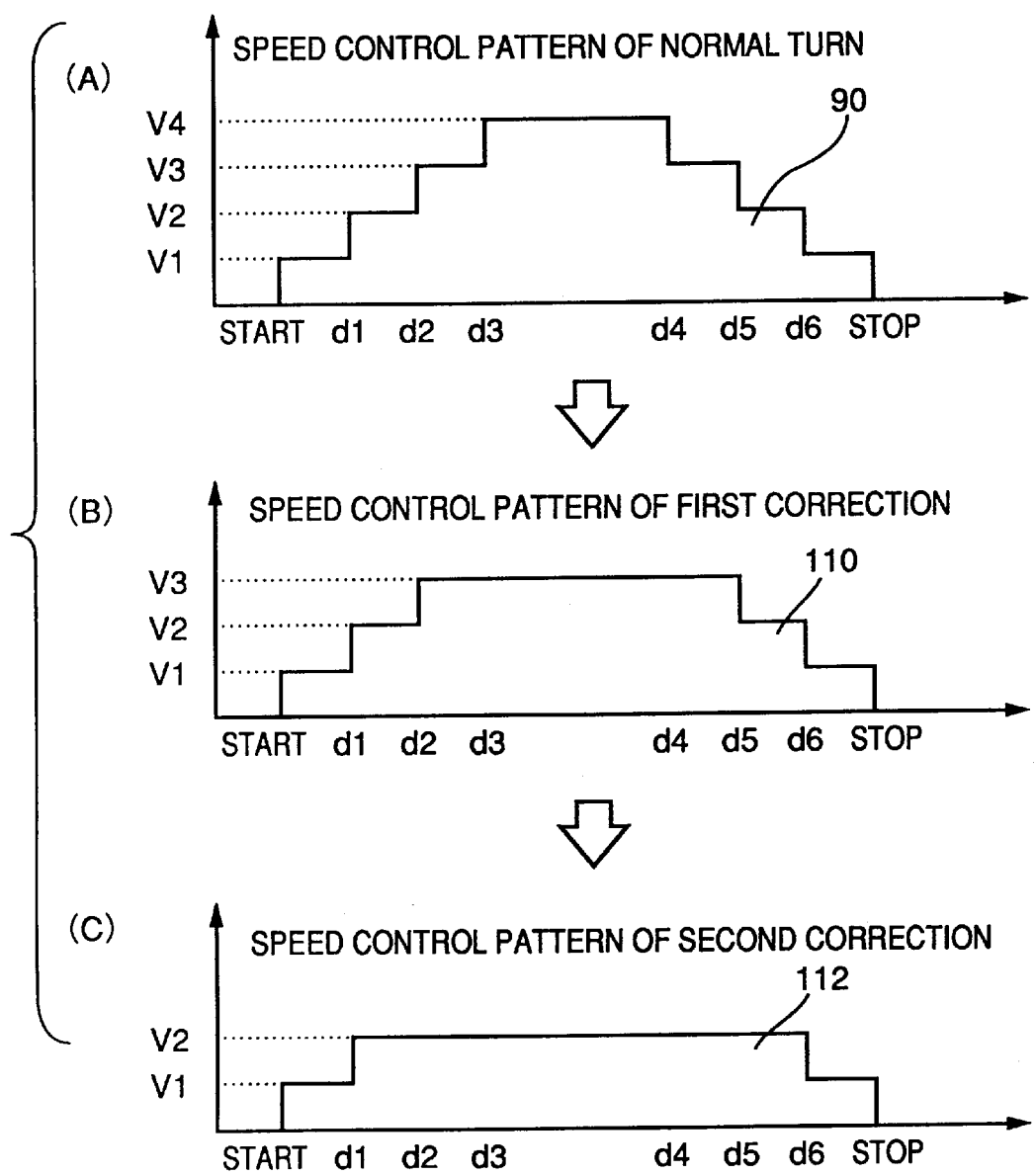
FIG. 11 shows a speed control pattern according to a third embodiment of the present invention.

For this purpose, control set forth in the following is provided. FIG. 11(A) shows a trapezoid travel pattern 90 corresponding to a normal turning operation. In the present embodiment, a trapezoid travel pattern 110 shown in FIG. 11(B) having the highest speed portion of speed control pattern 90 removed is used as the speed control pattern of the first correction. When this pattern is used, the possibility of occurrence of slipping again is increased in comparison to the case of the second embodiment if the correction amount is great. However, that possibility is lower than the case where the normal travel control pattern of FIG. 11(A) is used. The third embodiment further provides control set forth in the following. If slipping occurs using pattern 110 of FIG. 11(B), the angle must further be corrected. In this case, corrected turning is carried out using a speed control pattern 112 shown in FIG. 11(C) having a maximum speed that is lower by one step than that of the previous used trapezoid travel pattern 110 of FIG. 11(B). This means that the possibility of occurrence of slipping is further reduced in the second correction than in the first correction.

Figure 12:
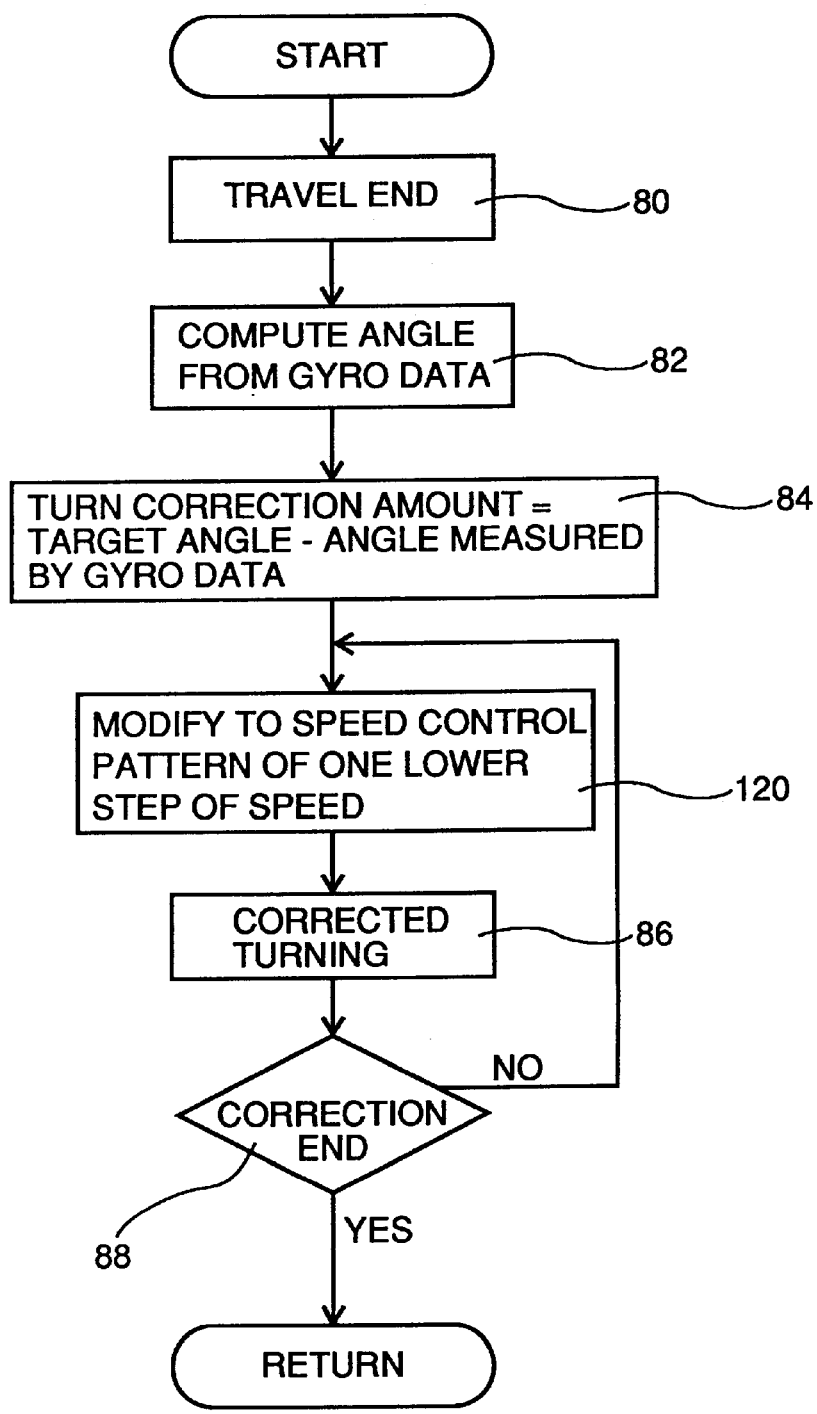
FIG. 12 is a flow chart of a correction process of the third embodiment.

The travel speed itself is higher than that of the second embodiment. This provides the advantage that the possibility of the correction ending at a shorter time is increased. FIG. 12 is a flow chart of a program for realizing the third embodiment. The flow chart of the present third embodiment shown in FIG. 12 differs from the flow chart of FIG. 7 in that a new step 120 is provided between step 84 and step 86 and in the repetitive process of steps 86 and 88. The remaining steps are identical to those of FIG. 7. Therefore, details thereof will not be repeated here.

At step 120 of FIG. 12, a process is carried out of employing a speed control pattern corresponding to a speed lower by one step than the speed control pattern used immediately before it for the drive of the drive wheels. Therefore, a speed control pattern having a maximum speed lower by one step than the previous speed control pattern is used to carry out the corrected turning. In the third embodiment, corrected turning is carried out at the highest possible travel speed in the corrected turn while suppressing the possibility of occurrence of slipping. There is an advantage that the possibility of ending the corrected turn in a shorter time becomes higher. The speed of the speed control pattern does not necessarily have to be reduced one step at a time. A plurality of steps may be reduced at one time.

Fourth Embodiment

Figure 13:
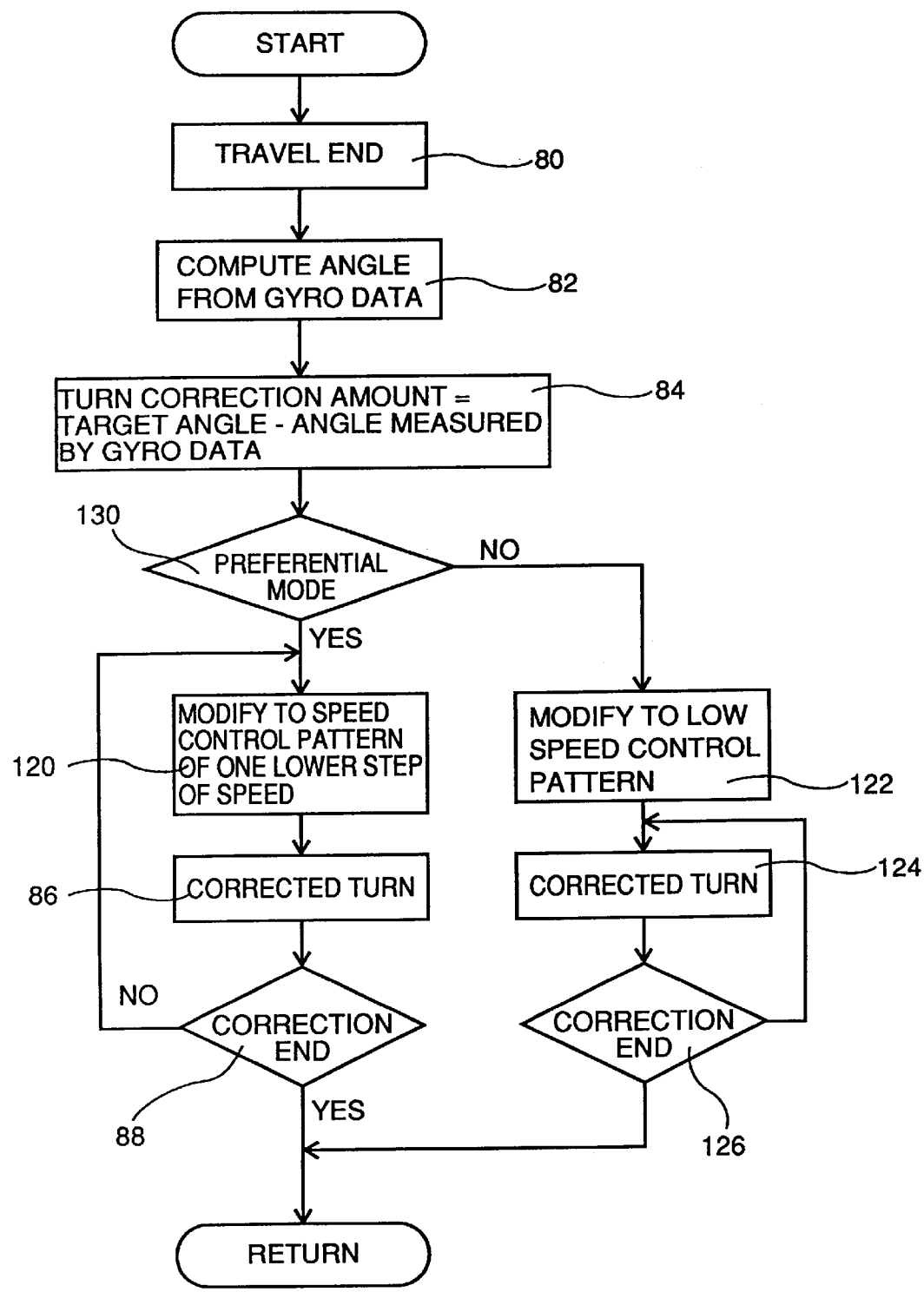
FIG. 13 is a flow chart of a correction process according to a fourth embodiment of the present invention.

In the second embodiment, reliable correction prevails over reduction in the time required for correction. In the third embodiment, a correction to be carried out at a shorter time was given priority. It is preferable to selectively give priority to the mode of correction according to the needs than in the case where correction has to be carried out according to only one mode given priority. An autonomous waxing robot according to a fourth embodiment of an autonomous vehicle of the present invention is aimed to allow such selection. FIG. 13 is a flow chart of a correction process program executed by the autonomous waxing robot of the fourth embodiment. The robot of the fourth embodiment has a key for selecting a preferential mode provided in operation unit 66 of FIG. 2.

Referring to FIG. 13, steps 80–84 are identical to step 80–84 of FIG. 7. Steps 120, 86 and 88 are similar to steps 120, 86 and 88 of FIG. 12. Steps 122, 124 and 126 of FIG. 13 are equal to steps 100, 86 and 88 of FIG. 10. Therefore, detailed description thereof will not be repeated here.

The flow chart of FIG. 13 is characterized by comprising a determination step 130 subsequent to step 84 for branching the control to step 120 or 122. In step 130, the mode specified by the preferential mode specify key of operation unit 66 of FIG. 2 is identified. When "speed preferential mode" is set, control proceeds to step 120, otherwise to step 122. When the operator wants to give priority to the correction speed, the preferential mode specify key of operation unit 66 is manipulated to set the speed preferential mode. Control similar to that of the third embodiment is provided.

As a result, the possibility of the correction process being completed at a shorter time is increased. When the operator specifies a mode other than the speed preferential mode, a process similar to that of the second embodiment is carried out. In this case, correction is carried out reliably although there is a possibility that the time required for correction may be longer.

According to the apparatus of the fourth embodiment, a mode is prepared according to which aspect of the corrected turn is to be given priority. By specifying a desired mode, a correction process is carried out giving priority to a certain aspect.

It should be noted that in the method of the third embodiment, the speed of the speed control pattern becomes lower in a step graded manner every time correction is required. In this case, control can be provided so that the speed control pattern used when correction is carried out becomes the initial speed control pattern of the next correction. Also, the speed control pattern used when correction is completed can be continuously employed as the subsequent travel speed control pattern. In this case, correction can be carried out at a few number of times of correction since the autonomous vehicle learns the optimum speed control pattern. As a result, the time required for the overall process can be reduced. If the speed control pattern used when correction is completed is set as the speed control pattern to be used thereafter, the autonomous vehicle can be made to run according to a control method less likely to encounter slipping. The possibility of an event requiring correction can be reduced. Therefore, there is a possibility that the time required for the overall task can be reduced.

Fifth Embodiment

Figure 14:
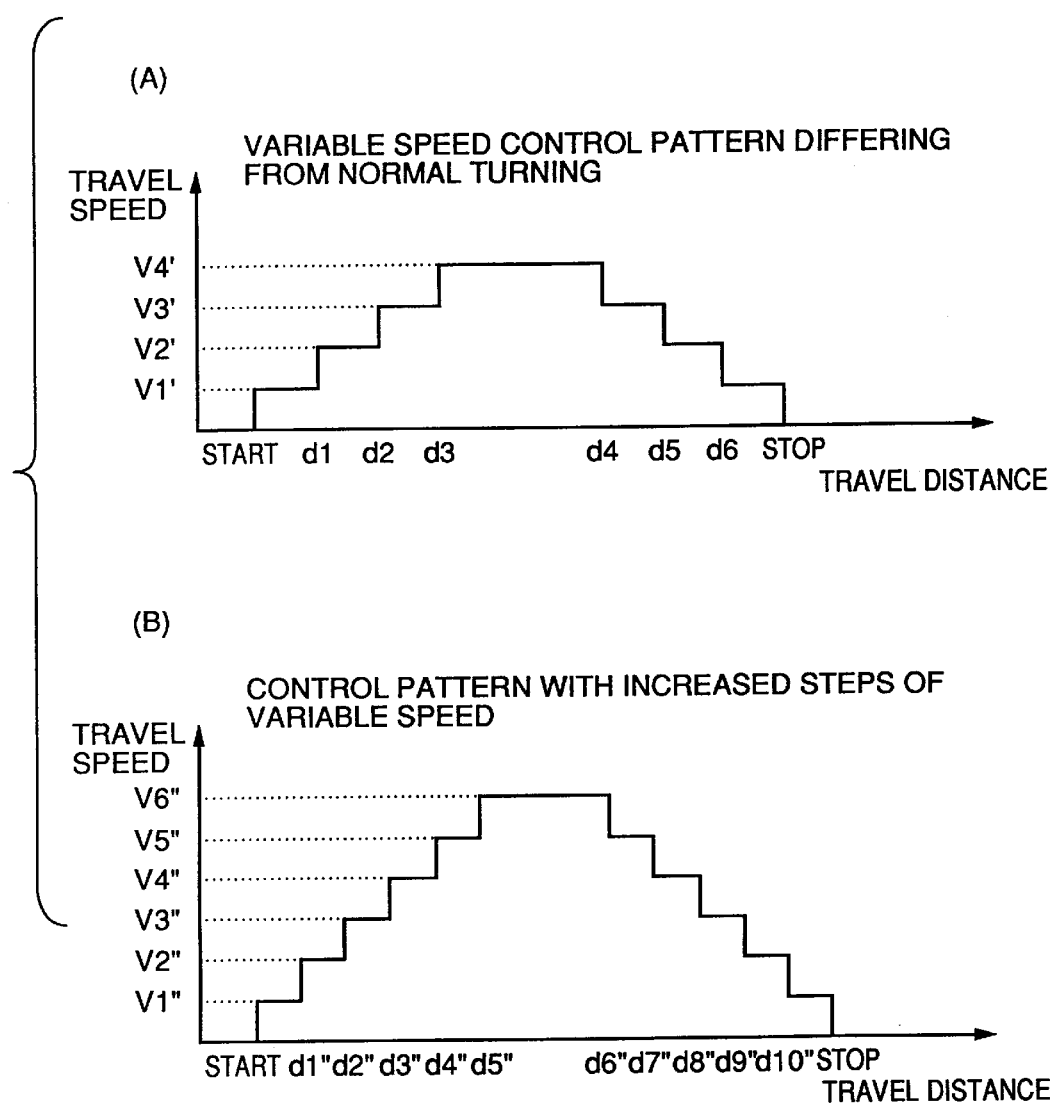
FIG. 14 shows a speed control pattern according to a fifth embodiment of the present invention.

An embodiment of modifying the trapezoid travel pattern itself will be described hereinafter. FIG. 14 shows an example of a control pattern for modifying the trapezoid travel pattern. In FIG. 14, (A) shows a control pattern employing a variable speed differing from that of a normal turning operation, and (B) shows a control pattern with increased steps of variable speed.

Referring to FIG. 14(A), when the entire speed pattern is set at a low level as a control pattern of a variable speed differing from that of a normal turning operation, extra memory will be required to store the plurality of speed patterns. Furthermore, the program will become complicated. However, there is an advantage that the speed for avoiding slipping can be set arbitrarily to provide control with a lower possibility of slipping. Furthermore, the variable speed points of d1, d2, d3, . . . can be set to values differing from those of the normal speed pattern.

The case where the number of steps of variable speed is increased will be described with reference to FIG. 14(B). Further memory is required than that of FIG. 14(A), and the program is more complicated. However, since a more subtle setting can be provided than the case of FIG. 14(A), control with less possibility of slipping is allowed. This is particularly effective for slipping at the time of variable speed.

All the control patterns are illustrated to have the pattern of the deceleration side symmetrical to that of the acceleration side. However, this symmetry is not a requisite. Since slipping does not easily occur at the time of deceleration even if the step of the variable speed is high, deceleration can be effected in steps greater than those of the acceleration stage. This provides the advantage that the robot comes to a stop faster.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An autonomous vehicle comprising:
   a chassis including a pair of drive wheels, said chassis traveling and turning towards an arbitrary direction by independent control of the pair of drive wheels,
   drive means for driving said drive wheels, said drive means driving said drive wheels at a speed according to a trapezoid travel pattern,
   angle detection means provided at said chassis for detecting a direction of said chassis, and
   angle correction means responsive to an output of said angle detection means at an end of a travel of a predetermined run indicating difference from a target value for correcting said drive wheels so that the direction of said chassis is corrected by a predetermined amount to be aligned with said target direction.

2. The autonomous vehicle according to claim 1, wherein said travel of a predetermined run is a turning operation of said autonomous vehicle.

3. An autonomous vehicle comprising:
   a chassis including a pair of drive wheels, said chassis traveling and turning towards an arbitrary direction by independent control of the pair of drive wheels,
   drive means for driving said drive wheels, said drive means driving said drive wheels at a speed according to a trapezoid travel pattern,
   angle detection means provided at said chassis for detecting a direction of said chassis, and
   angle correction means responsive to an output of said angle detection means at an end of a travel of a predetermined run indicating difference from a target value for correcting said drive wheels so that the direction of said chassis is corrected by a predetermined amount to be aligned with said target direction,
   wherein said drive means drives said drive wheels at a speed according to a plurality of types of trapezoid travel patterns having different speeds from each other.

4. The autonomous vehicle according to claim 3, wherein said drive means drives said drive wheels at a speed according to at least three types of trapezoid travel patterns having different maximum speeds from each other,
   wherein said drive means selects in a step-graded manner a trapezoid travel pattern having a maximum speed lower than the maximum speed of a trapezoid travel pattern used immediately before for driving said drive wheels according to the selected trapezoid travel pattern in angle correction.

5. The autonomous vehicle further comprising:
   a chassis including a pair of drive wheels, said chassis traveling and turning towards an arbitrary direction by independent control of the pair of drive wheels,
   drive means for driving said drive wheels,
   angle detection means provided at said chassis for detecting a direction of said chassis, and
   angle correction means responsive to an output of said angle detection means at an end of a travel of a predetermined run indicating difference from a target value for correcting said drive wheels so that the direction of said chassis is corrected by a predetermined amount to be aligned with said target direction, and
   means for specifying an angle correction mode,
   wherein said drive means carries out angle correction at a predetermined first control mode when a first angle correction mode is specified, and
   at a predetermined second control mode different from said first control mode when a second angle correction mode is specified.

6. A control method of an autonomous vehicle including a pair of drive wheels for running and turning towards an arbitrary direction by independent control of said pair of drive wheels, said control method comprising:
   an angle detection step of detecting a direction of a chassis,
   a step of determining difference of an output of said angle detection step at an end of a travel of a predetermined run from a target direction, and
   a step of driving said drive wheels at a speed according to a trapezoid travel pattern so that the direction of said chassis is corrected by a predetermined amount to be aligned with said target direction.

7. The autonomous vehicle according to claim 6, wherein said travel of a predetermined run is a turning operation of said autonomous vehicle.

8. A control method of an autonomous vehicle including a pair of drive wheels for running and turning towards an arbitrary direction by independent control of said pair of drive wheels, said control method comprising:
   a mode specify step of specifying an angle correction mode,
   an angle detection step for detecting a direction of a chassis,
   a step of determining difference of an output of said angle detection step at an end of a travel of a predetermined run from a target direction, and
   a correction step of driving said drive wheels so that the direction of said chassis is corrected by a predetermined amount to be aligned with said target direction in a predetermined first control mode when a first angle correction mode is specified in said mode specify step, and of driving said drive wheels so that the direction of said chassis is corrected by a predetermined amount to be aligned with said target direction in a predetermined second control mode differing from said first control mode when a second angle correction mode is specified in said mode specify step.

9. The control method of an autonomous vehicle according to claim 8, wherein said travel of a predetermined run is a turning operation of said autonomous vehicle.

10. An autonomous vehicle comprising:
    a chassis,
    a pair of drive wheels,
    a motor for driving said drive wheels at a speed according to a trapezoid travel pattern,
    a gyrosensor provided at said chassis for detecting a direction of said chassis, and
    a travel control unit responsive to difference of an output of said gyrosensor at an end of a travel of a predetermined run from a target direction for providing control of a rotational amount of said drive wheels so that the direction of said chassis is corrected by a predetermined amount to be aligned with said target direction.

11. The autonomous vehicle according to claim 10, wherein said pair of drive wheels rotate at a speed according to a pair of motors corresponding thereto.

12. The autonomous vehicle according to claim 11, wherein said motors drive said drive wheels at a speed according to a plurality of types of trapezoid travel patterns having different speeds from each other, and wherein said motors drive said drive wheels respectively according to a first trapezoid travel pattern in a normal run and a second trapezoid pattern having a maximum speed lower than the maximum speed of said first trapezoid travel pattern in angle correction.

13. The autonomous vehicle according to claim 12, wherein said motors drive said drive wheels at a speed according to at least three types of trapezoid travel patterns having a maximum speed differing from each other, wherein said motors select in a step-graded manner a trapezoid travel pattern having a maximum speed lower than the maximum speed of a trapezoid travel pattern used immediately before to drive said drive wheels according to a selected trapezoid travel pattern in angle correction.

14. The autonomous vehicle according to claim 10, wherein said travel of a predetermined run is a turning operation of said autonomous vehicle.

15. The autonomous vehicle further comprising:

a chassis, a pair of drive wheels, a motor for driving said drive wheels, a gyrosensor provided at said chassis for detecting a direction of said chassis, and a travel control unit responsive to difference of an output of said gyrosensor at an end of a travel of a predetermined run from a target direction for providing control of a rotational amount of said drive wheels so that the direction of said chassis is corrected by a predetermined amount to be aligned with said target direction, and an operation unit for specifying an angle correction mode, wherein said motor carries out angle correction in a predetermined first control mode when a first angle correction mode is specified, and for carrying out an angle correction at a predetermined second control mode differing from said first control mode when a second angle correction mode is specified.

16. An autonomous vehicle comprising:

a chassis, a motor for driving a pair of drive wheels at a speed according to a trapezoid travel pattern, a travel control unit for controlling said motor, and a gyrosensor provided at said chassis for detecting a direction of said chassis, wherein said travel control unit determines whether an output of said gyrosensor at an end of a travel of a predetermined run differs from a target direction, and when the output differs, provides control of said motor so that the direction of said chassis is aligned with said target direction.

17. The autonomous vehicle according to claim 16, wherein said travel of a predetermined run is a turning operation of said autonomous vehicle.

18. The autonomous vehicle according to claim 17, wherein said pair of drive wheels rotate at a speed by a pair of respective motors.

19. The autonomous vehicle comprising:

a chassis, a motor for driving a pair of drive wheels, a travel control unit for controlling said motor, and a gyrosensor provided at said chassis for detecting a direction of said chassis, wherein said travel control unit determines whether an output of said gyrosensor at an end of a travel of a predetermined run differs from a target direction, and when the output differs, provides control of said motor so that the direction of said chassis is aligned with said target direction, and wherein said travel of a predetermined run is a turning operation of said autonomous vehicle, wherein a rotating speed of said motor when the output of said gyrosensor differs from said target direction is slower than the speed when said autonomous vehicle is turning.

20. An autonomous vehicle comprising;

a chassis including a pair of drive wheels, said chassis travelling and turning towards an arbitrary direction by independent control of the pair of the drive wheels, drive means for driving said drive wheels, said drive means driving said drive wheels at a speed according to a trapezoid travel pattern, angle detection means provided at said chassis for detecting a direction of said chassis and angle correction means responsive to an output of said angle detection means at an end of a travel of a predetermined run indicating difference from a target value for causing said driving means to stop said autonomous vehicle and for correcting said drive wheels so that the direction of said chassis is corrected by a predetermined amount to be aligned with said target direction.

* * * * *